(No Model.)
V. LAPP.
APPARATUS FOR TREATING MASH IN BREWING, &c.
No. 581,354. Patented Apr. 27, 1897.
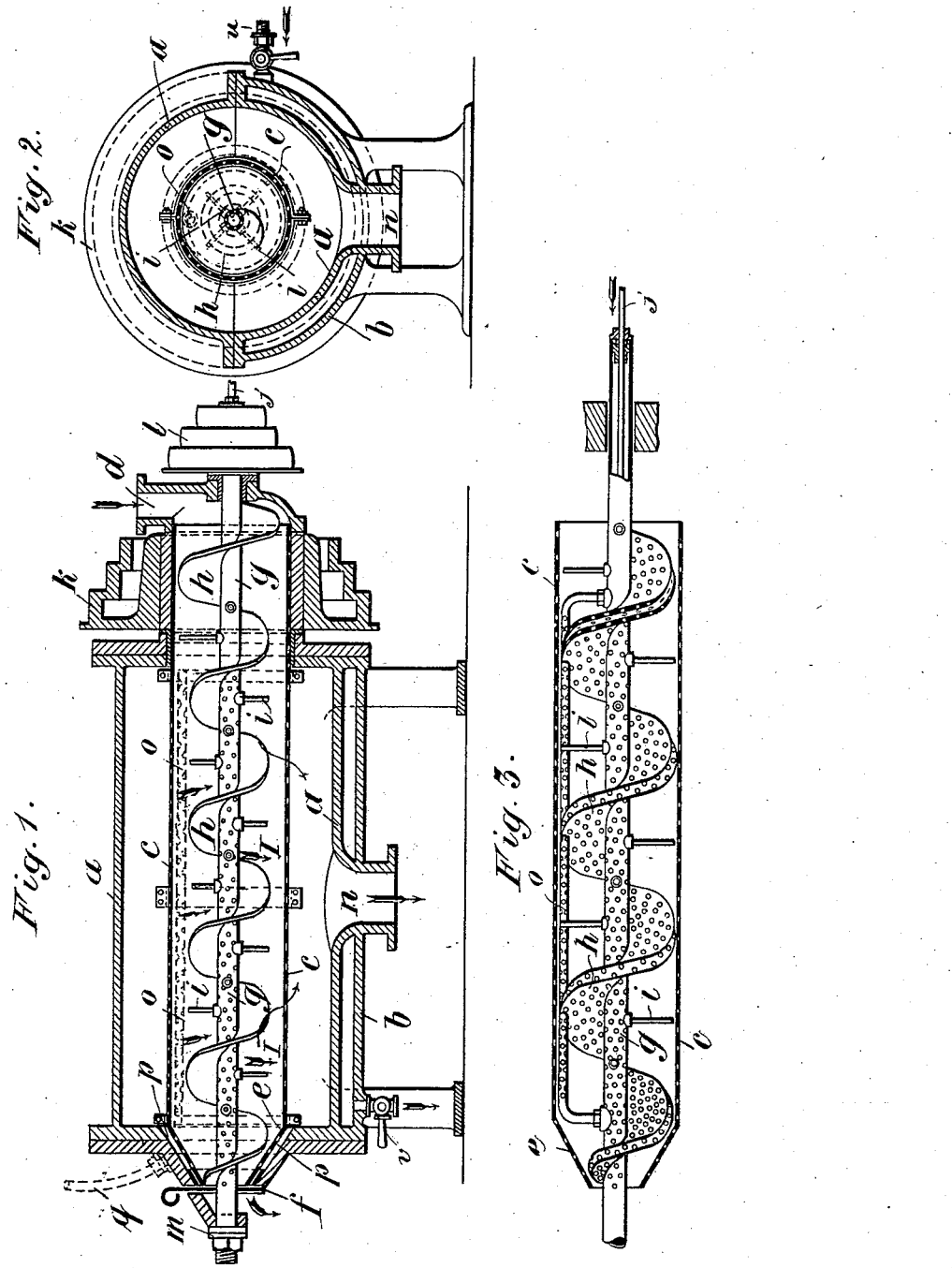
WITNESSES:
Henry T. Hirsch.
M. F. Boyle
Valentin Lapp, Inventor
By Thomas Drew Stetson
Attorney

UNITED STATES PATENT OFFICE.

VALENTIN LAPP, OF LEIPSIC, GERMANY.

APPARATUS FOR TREATING MASH IN BREWING, &c.

SPECIFICATION forming part of Letters Patent No. 581,354, dated April 27, 1897.

Application filed October 22, 1895. Serial No. 566,563. (No model.) Patented in Germany April 17, 1894, No. 82,077.

*To all whom it may concern:*

Be it known that I, VALENTIN LAPP, a subject of the King of Saxony, residing at Leipsic-Lindenau, Saxony, Germany, have made a new and useful invention for the Improvements in Apparatus for Treating Mash in Brewing for Obtaining the Wort Therefrom, (for which I have obtained a patent in Germany, No. 82,077, dated April 17, 1894,) of which the following is a full and exact specification.

It is difficult in brewing to separate the beer-wort, produced by the mashing process, completely and rapidly from the grains and to obtain a pure and clear wort when, as is usual, the grains are brought together with the wort into the filter-presses, where the worts are expressed.

According to the present invention the wort is obtained by first completely separating the grains from the wort in an uninterrupted operation and then filtering the wort by itself.

First the wort, without any addition of water, is separated from the grains in a straining apparatus. The grains still containing much wort are then moved along the straining-surface and are subjected to the action of jets of water supplied in the form of finely-divided streams or sprays, so that the grains which are being moved slowly along the straining-surface are continually sprayed over again by fresh water and washed, the water then flowing off with the washed-out wort.

The accompanying drawings form a part of this specification and represent what I consider the best means of carrying out the invention.

Figure 1 is a vertical longitudinal section, and Fig. 2 a transverse section on the line 2 2 in Fig. 1. Fig. 3 is a longitudinal section of the main portion, showing a modification.

Similar letters of reference indicate corresponding parts in all the figures.

The apparatus is usually arranged between the mash-tun and the filtering apparatus, (not shown,) and comprises a fixed casing $a$, composed of two parts bolted together. The lower half is provided with a heating device (shown as a steam-jacket $b$) which incloses about half of the casing and is adapted to be heated by steam or hot water. Arranged in the casing $a$ and capable of rotating therein is a perforated cylinder $c$, having one end open to receive the mash and the other end $e$ made of conical shape and provided with a sluice or sliding valve $f$. At this end the grains are ejected when completely washed. The cylinder is also made in two parts for facilitating the cleaning thereof.

Inside the cylinder $c$ is arranged a hollow shaft $g$, a portion of which is perforated, the perforations extending from a point about one-third of its length from the inlet end. Water at the temperature of about 60° Celsius is supplied through the pipe $j$, connected through a stuffing-box, for washing the grains.

The shaft is fitted with a spiral conveyer or worm consisting of nearly or quite continuous spiral blades $h$ for conveying the grains in the longitudinal direction of the perforated cylinder and with radially-arranged bars $i$ for continually loosening the grains. The perforated cylinder $c$, which is driven by a stepped pulley $k$, and the hollow shaft $g$, also driven by a stepped pulley $l$, are caused to revolve in opposite directions and at various speeds according to requirements. The perforated shaft $g$ is provided at its end with a readily-removable screw-cap $m$, on the removal of which the hollow shaft may be readily cleaned from the inside.

This separating apparatus operates as follows: As the mash conveyed to the apparatus after the completion of the mashing process travels along the first portion of the cylinder around the non-perforated portion of the hollow shaft the wort is separated from the grains by simply draining off and flowing down through the strainer-holes of the cylinder $c$ into the lower space of the casing $a$. The grains are propelled along and supplied with water in a finely-divided condition, so that they are washed more and more thoroughly. The water is thus supplied by means of the perforated hollow shaft, and a small quantity thus supplied carries away all the wort with it. The weak wort extracted near the close mingles with the stronger wort extracted at the commencement, and the whole flows down through the strainer-holes of the cylinder and away through the discharge-passage $n$. In this operation the water meets always grains that have a smaller and smaller quantity of wort, and the heat being maintained it extracts the wort with practical completeness from the grains. On the entrance of the grains in the conical portion $e$ at the delivery end of the apparatus the water that is still adhering to the grains is caused by the conical shape of the part $e$ to flow back into the cylinder and out into the casing $a$. The exit of the grains may be controlled by adjusting the sliding valve $f$—that is to say, may be more or less retarded in such a manner that on being pressed out by the pressure of the worm conveyer the very last remnants of wort are obtained and led back into the casing $a$. During the whole of this process the casing is heated.

Inside the perforated cylinder $c$ a second perforated pipe $o$ is provided, extending along near the jacket. This also sprays water upon the grains and keeps the strainer-holes of the cylinder $c$ clean. This pipe $o$ is fixed to the cylinder-shell and receives its spraying-water in all positions from a circular channel or jacket $p$, enveloping the conical portion of the casing $a$, to which the water is supplied by means of a pipe $q$. (Shown in dotted lines in Fig. 1.) The revolving of the hollow shaft $g$, with its screw wing or wings $h$ and radial bars $i$, in the opposite direction, turned by a belt (not shown) running on the pulley $l$, tends to still further agitate the mash and to move it forward from the right to the left, finally delivering it in a thoroughly washed-out condition past the sluice-valve $f$. The revolving of the cylinder $c$ by the action of the belt (not shown) on the pulley $k$ tends to still further agitate the mash and to keep the perforations in the cylinder clear, so that it discharges freely all the wort which is extracted from the mash in its passage.

Modifications may be made without departing from the principle or sacrificing the advantages of the invention.

The perforated pipe $o$ may be connected to the shaft $g$, as indicated in Fig. 3, and in such case will receive its spraying-water from the interior of such shaft. Also, the blades $h$, as indicated in Fig. 3, may be made hollow and be perforated and receive water from the interior of the hollow shaft, in order to enable a large quantity of water to be sprayed into all parts of the apparatus.

This apparatus enables the grain to be mashed in a very minute state of subdivision.

I do not herein claim the method of obtaining a high percentage of beer-wort, consisting generally in spraying water into the mash and straining out the gradually-weakened wort, as the same forms the subject-matter of my separate application for patent filed October 22, 1895, Serial No. 566,564.

I claim as my invention—

1. In apparatus for extracting beer-wort, having a casing $a$ and jacket $b$, with provisions $u$, $v$, for circulating a heating fluid in the latter, and provisions for inducting mash and delivering washed grains, the combination therewith of the perforated hollow cylinder $c$ and means $k$ for revolving it, and the hollow shaft $g$ carrying helical wings $h$, with means for revolving it in the direction opposite to the revolutions of the cylinder, all arranged for joint operation substantially as herein specified.

2. In apparatus for extracting beer-wort, having a casing $a$ and jacket $b$, with provisions $u$, $v$, for circulating a heating fluid in the latter, and provisions for inducting mash and water and delivering washed grains, the combination therewith of a perforated hollow cylinder $c$ provided with the conical delivery end $e$, and means $k$ for revolving it, together with the hollow shaft $g$ carrying helical wings $h$ correspondingly tapered at the delivery end, and with means for revolving it in the direction opposite to the revolutions of the cylinder, adapted to allow the expulsion of the washed grains and the retention and leading backward of the wort, all arranged for joint operation substantially as herein specified.

3. In apparatus for extracting beer-wort, having a casing $a$ and jacket $b$, with provisions $u$, $v$, for circulating a heating fluid in the latter, and provisions for inducting mash and delivering washed grains, the combination therewith of a perforated hollow cylinder $c$, and means $k$ for revolving it, the hollow shaft $g$ carrying helical wings $h$, with provisions for supplying water thereto, and spraying it therefrom, and with means for revolving it in the opposite direction, and the ring or channel $p$ extending around the delivery end receiving water through any convenient means, and the perforated pipe $o$ extending longitudinally within the cylinder $c$ out of the center thereof receiving water in all such positions from such channel, substantially as herein specified.

In testimony whereof I have signed my name to this specification in the presence of two subscribing witnesses.

VALENTIN LAPP.

Witnesses:
RUDOLPH FRICKE,
J. B. CLANTICE.